(12) United States Patent
Merrick et al.

(10) Patent No.: US 6,582,749 B2
(45) Date of Patent: Jun. 24, 2003

(54) LOW FAT EDIBLE EMULSIONS

(75) Inventors: William George Merrick, Wirral (GB); Thomas Foley, Birkenhead (GB); Stefanie M. Reineke, Lübeck (DE); Kathrin Angelika Assmann, Gleschendorf (DE)

(73) Assignee: Hahntech International Limited, Mold (GB)

( * ) Notice: Subject to any disclaimer, the term of this patent is extended or adjusted under 35 U.S.C. 154(b) by 0 days.

(21) Appl. No.: 09/802,205

(22) Filed: Mar. 8, 2001

(65) Prior Publication Data

US 2001/0043980 A1 Nov. 22, 2001

(30) Foreign Application Priority Data

Mar. 9, 2000 (GB) .............................................. 0005736

(51) Int. Cl.⁷ ................................................. A23D 7/00
(52) U.S. Cl. ....................................... 426/602; 426/613
(58) Field of Search ................................ 426/604, 613, 426/602

(56) References Cited

U.S. PATENT DOCUMENTS

| | | | |
|---|---|---|---|
| 3,809,764 A | | 5/1974 | Gabby et al. |
| 3,914,458 A | * | 10/1975 | Terada et al. ................ 426/604 |
| 3,928,648 A | * | 12/1975 | Stahl et al. ................... 426/564 |
| 3,935,325 A | * | 1/1976 | Gilmore et al. .............. 426/585 |
| 3,946,122 A | | 3/1976 | Scharp |
| 4,539,215 A | * | 9/1985 | Schweid et al. ............. 426/573 |
| 4,810,518 A | * | 3/1989 | Haisman et al. ............. 426/453 |
| 5,149,557 A | * | 9/1992 | Morrison et al. ............ 426/570 |
| 5,252,352 A | | 10/1993 | Banach et al. |
| 5,444,041 A | * | 8/1995 | Owen et al. ............... 424/193.1 |
| 5,503,866 A | * | 4/1996 | Wilhelm, Jr. ................. 106/243 |
| 5,620,734 A | * | 4/1997 | Wesdorp et al. ............. 426/601 |
| 5,646,109 A | * | 7/1997 | Owen et al. .................. 424/400 |
| 5,939,128 A | * | 8/1999 | Kleinherenbrink et al. . 426/601 |
| 5,958,498 A | * | 9/1999 | Trueck et al. ................ 426/605 |
| 6,068,876 A | * | 5/2000 | Miller et al. ................. 426/602 |
| 6,251,441 B1 | * | 6/2001 | Van Den Braak et al. ...... 426/2 |
| 2001/0043980 A1 | * | 11/2001 | Merrick et al. .............. 426/613 |

FOREIGN PATENT DOCUMENTS

| | | |
|---|---|---|
| EP | 0 441 494 A | 8/1991 |
| WO | WO 01/10235 | 2/2001 |

OTHER PUBLICATIONS

Database WPI, Section Ch, Week 198335, Derwent Publications Ltd., London, GB; AN 1983–749328, XP002169729 & JP 58 121766 A (Ajinomoto KK), Jul. 20, 1983 Abstract Only.

* cited by examiner

*Primary Examiner*—Carolyn Paden
(74) *Attorney, Agent, or Firm*—Samuels, Gauthier and Stevens, LLP

(57) ABSTRACT

An edible emulsion is disclosed having a fat content of less than 5 weight %. An edible fat or oil component is dispersed in an aqueous phase with a two-component emulsifier system comprising a primary emulsifier which acts to stabilise the emulsion and a secondary emulsifier which works in synergy with the fat or oil component to impart a desirable texture and structure to the finished product.

11 Claims, No Drawings

LOW FAT EDIBLE EMULSIONS

BACKGROUND OF THE INVENTION

1. Field of the Invention

This invention relates to an edible emulsion having a much lower fat content than conventional emulsions, and to a method of making it. Such emulsions may for example be used for spreads to be used as alternatives for butter or margarine. Other possible uses include salad dressings to be used instead of mayonnaise or salad cream, and low fat desserts.

2. Description of the Prior Art

Conventional edible emulsions typically comprise a fat or oil phase dispersed in an aqueous phase, although other emulsions are known in which the fat or oil comprises the continuous phase and has the aqueous phase dispersed in it. The typical fat contents in conventional water-continuous emulsions ranges from about 80% down to 40%, and although it is in some cases regarded as desirable to reduce the fat content, it has been found difficult to produce a satisfactory emulsion having a fat content much below 20–25% since the fat or oil phase is necessary to impart the required flavour and texture.

Conventional edible emulsions of the type to which the invention relates generally include a small quantity of an emulsifier and well as protein or other dairy components, gelling agents, stabilizers, flavouring, colouring etc. Some typical compositions are disclosed in EP-A-463688, which discloses plastic edible emulsions in which the oil or fat component is dispersed in a continuous aqueous phase. Although the claimed range is 5 to 21 wt. %, the exemplified compositions contain 19.6 wt. % of palm mid-fraction as the fat component.

SUMMARY OF THE INVENTION

It is accordingly an object of the invention to provide an edible emulsion containing less than 5% by weight of oil or fat component.

According to the present invention this object is achieved by a low fat edible emulsion wherein less than 5 wt. % of fat or oil component is dispersed in water, together with a sufficient quantity of an emulsifier to impart the texture and flavour required of such an emulsion. It has been found that the emulsifier can work in synergy with the fat or oil component to impart a desirable texture and structure to the finished product with good spreading properties so that it resembles a product with a much higher fat content.

The edible emulsion of the invention comprises an aqueous dispersion of an edible fat or oil component and an emulsifier system. The fat or oil component is present in an amount less than 5 wt. %, based on the total emulsion, and the emulsifier system is a two-component or multi-component system which comprises a primary emulsifier comprising one or more components selected from proteins, skim milk powder, polysorbates, Datem, Citrem, sucrose esters, octenyl succinic acid (OSA) starches and gum arabic, acting to stabilise the emulsion, and a secondary emulsifier comprising one or more components selected from mono- and diglycerides, polysorbates, polyglycerol esters, organic acid esters of mono- and diglycerides, propylene glycol esters, stearyl lactylates, lecithin and sucrose fatty acid esters.

DETAILED DESCRIPTION OF THE PREFERRED EMBODIMENTS

The aqueous phase of the composition may for example contain minor quantities of milk or other dairy components, bulking agents, gelling agents, starches and stabilizers. The oil phase comprises oils or fats which are edible and of the type generally used in the food industry.

Minor ingredients such as salt, phosphates, citrates, colouring, flavouring, vitamins, preservatives and food acids are also desirable components of the edible emulsions of the invention.

The secondary emulsifier is chosen from a group that is capable of creating this desirable texture and structure. These include mono- and diglycerides, polysorbates, polyglycerol esters, organic acid esters of mono- and diglycerides, propylene glycol esters, stearyl lactylates, lecithin and sucrose fatty acid esters. Especially useful are those emulsifiers which are prepared from unsaturated or partially unsaturated fats. The secondary emulsifier can be added as part of the fat or oil phase and by careful selection of the emulsifier type and grade, it can also be included as part of the aqueous phase.

While the inventors do not wish to be bound by any particular theory, the secondary emulsifier is believed to function by partly destabilising the oil in water emulsion to create a substantially semi-solid plastic matrix. The emulsion preferably contains from 0.2 to 2 wt. % of this secondary emulsifier.

Fats and oils can be selected from any suitable vegetable, animal or dairy source and include oils, hydrogenated and unhydrogenated fat as well as fractionated fats. The fat content is preferably at least 2 wt. %.

The oil in water emulsion is made by emulsifying the fat phase such that a dispersion of small uniform oil droplets is formed. This emulsification process can be enhanced by the use of a high pressure homogeniser, colloid mill, Silverson mixer or similar equipment together with the presence of the primary emulsifier. This agent has a function which is different from that of the aforementioned secondary emulsifier in that its primary role is to create a stable oil in water emulsion and is selected from proteins, especially caseinate and whey protein, skim milk powder and other materials which act as oil in water emulsifiers and include, but are not limited to, polysorbates, Datem, Citrem, sucrose esters, OSA starches and gum arabic. Certain emulsifiers, which include polysorbates, are multifunctional and provide the necessary oil in water emulsification. However, paradoxically they can also act to create a de-stabilisation of this emulsion. The total content of such emulsifying agents is preferably from 0.1 to 10 wt. %. Homogenization preferably takes place at a pressure of 2 to 50 MPa (20 to 500 bar), more preferably 5 to 20 MPa (50 to 200 bar).

The components which may be present in the aqueous phase include bulking agents such as maltodextrin, dairy proteins, inulin and polydextrose which are used together with thickeners and gelling agents. Thickeners include, but are not limited to, LBG, guar, xanthan alginate, Konjac, starches (native and modified), CMC, MCC. A typical composition may contain a total of 0.5 to 3 wt. % of these components.

Typical gelling agents include, but are not limited to, gelatin, carrageenan, alginate, pectin, gel forming starches or synergistic combinations of gums selected by those skilled in the art. The aqueous phase can be of a gelled nature or have enough viscosity to provide the body and structure into which the destabilised oil droplets is contained. The total content of these components is preferably 0.5 to 5 wt. %.

Heat treatment of the emulsion is desirable to confer microbiological stability to the product and for products which have a pH value of more than about 4 they are preferably heated to at least 80° C. and preferably above 85° C. A plate heat exchanger or scrape surface heat exchanger is suitable for this purpose. The product may be filled hot or cold. After filling the products are preferably stored under refrigeration.

The following formulations are shown to illustrate the invention:

EXAMPLE 1

|  | % |
|---|---|
| Hydrogenated coconut oil | 3.5 |
| Hydrogenated palm oil | 0.6 |
| Secondary Emulsifier* | 0.8 |
| CMC [Carboxy methyl cellulose] | 0.52 |
| Gelatin | 0.56 |
| Konjac mannan | 0.01 |
| Dairy protein [Simplesse 100 ®] | 2.0 |
| Skimmed milk powder | 6.02 |
| Poly fructose [Raftiline HP] | 6.0 |
| Salt | 1.0 |
| Potassium sorbate | 0.1 |
| Beta carotene dispersion | 0.03 |
| Water | 78.86 |

*Unsaturated mono- and diglyceride e.g. Dimodan OT

The fat content of this product is 4.9%.

The secondary emulsifier was added to the fats and melted to 65–70° C. The rest of the dry ingredients were added to water at 45–50° C. The molten fat phase was added to the aqueous phase with agitation to keep the fat in suspension prior to further processing and to allow the dry ingredients to swell and hydrate. The β-carotene solution is added to this coarse oil in water emulsion.

The pH was adjusted to 6.6–6.7 using a buffer salt such a tetrasodium pyrophosphate. The emulsion was heated using a plate heat exchanger to 85° C. and passed through a 2 stage high pressure piston homogeniser at 200 Bar and 50 Bar. The product was then heated again to achieve a temperature of 120° C. also using a plate heat exchanger. The product was cooled to 85° C. using the plate exchanger prior to hot filling.

EXAMPLE 2

Example 1 was repeated with the exception that after cooling to 85° C., the product was further cooled to 10° C. before filling using a scrape surface heat exchanger e.g. Schroeder Kombinator.

EXAMPLE 3

Example 1 was repeated with the exception that the coconut oil was replaced with a fractionated palm oil containing a high percentage of solid fat at 20° C.

EXAMPLES 4–6

The fat content was reduced as follows and the hydrocolloid levels were adjusted:

|  | 4 % | 5 % | 6 % |
|---|---|---|---|
| Fractionated palm oil | 1.6 | 0.6 | 0.0 |
| Hydrogenated palm oil | 1.6 | 1.6 | 1.2 |
| Secondary Emulsifier* | 0.8 | 0.8 | 0.8 |
| CMC [Carboxy methyl cellulose] | 0.5 | 0.5 | 0.5 |
| Gelatin | 0.8 | 1.0 | 1.2 |
| Konjac mannan | 0.015 | 0.02 | 0.025 |
| Dairy protein [Simplesse 100 ®] | 2.0 | 2.0 | 2.0 |
| Skimmed milk powder | 6.0 | 6.0 | 6.0 |
| Poly fructose [Raftiline HP] | 6.0 | 6.0 | 6.0 |
| Salt | 1.0 | 1.0 | 1.0 |
| Potassium sorbate | 0.1 | 0.1 | 0.1 |
| Beta carotene dispersion | 0.03 | 0.03 | 0.03 |
| Water | 79.555 | 80.35 | 81.143 |
| Fat content | 4.0% | 3.0% | 2.0% |

*Unsaturated mono- and diglyceride e.g. Dimodan OT

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. An edible emulsion comprising an aqueous dispersion of an edible fat or oil component and an emulsifier system, wherein said fat or oil component is present in an amount less than 5 wt. %, based on the total emulsion, and wherein the emulsifier system comprises:
    a primary emulsifier comprising at least one component selected from the group consisting of proteins, skim milk powder, octenyl succinic acid (OSA), starches, caseinate, whey protein, milk powder, gelatin and gum Arabic; and
    a secondary emulsifier said secondary emulsifier comprising at least one component selected from the group consisting of mono- and diglycerides, polysorbates, polyglycerol esters, organic acid esters of mono- and diglycerides, propylene glycol esters, stearyl lactylates, lecithin and sucrose fatty acid esters.

2. An edible emulsion according to claim 1 which contains 0.1 to 10 wt. % of said primary emulsifier, based on the total emulsion.

3. An edible emulsion according to claim 1 wherein said secondary emulsifier is prepared from unsaturated or partially unsaturated fats.

4. An edible emulsion according to claim 1 which contains from 0.2 to 2 wt. % of said secondary emulsifier, based on the total emulsion.

5. An edible emulsion according claim 1, further comprising 0.5 to 5 wt. % of a gelling agent.

6. An edible emulsion according to claim 1, further comprising 0.5 to 3 wt. % of a thickening agent.

7. An edible emulsion according to claim 1 wherein said secondary emulsifier is selected from the group consisting of monoglycerides, diglycerides and polyglycerol esters.

8. An edible emulsion according to claim 7 wherein said secondary emulsifier is prepared from unsaturated or partially unsaturated fats.

9. A method of making an edible emulsion according to claim 1, which method comprises melting the fat or oil component, adding the primary emulsifier and any other dry ingredients to water, adding the secondary emsulsifier to at least one of the fat or oil component and the aqueous phase, adding the molten fat or oil to the aqueous phase with agitation to keep the fat or oil in suspension as small uniform droplets and processing the suspension to allow the dry ingredients to swell and hydrate.

10. A method according to claim 9 comprising the further step of heating the emulsion and homogenising it under pressure prior to cooling.

11. An edible emulsion comprising an aqueous dispersion of an edible fat or oil component and an emulsifier system, wherein said fat or oil component is present in an amount of at least 2 wt. % but less than 5 wt. %, based on the total emulsion, and wherein the emulsifier system comprises:

a primary emulsifier, acting to stabilize said emulsion and comprising at least one component selected from the group consisting of caseinate, whey protein, milk powder and gelatin; and a secondary emulsifier, tending to destabilize said emulsion to create a substantially semi-solid plastic matrix, said second emulsifier comprising at least one component selected from the group consisting of mono- and diglycerides, polysorbates, polyglycerol esters, organic acid esters of mono- and diglycerides, propylene glycol esters, stearyl lactylates, lecithin and sucrose fatty acid esters.

* * * * *